US006716533B2

(12) United States Patent
Griswold et al.

(10) Patent No.: US 6,716,533 B2
(45) Date of Patent: Apr. 6, 2004

(54) PAPER RELEASE COMPOSITIONS HAVING IMPROVED ADHESION TO PAPER AND POLYMERIC FILMS

(75) Inventors: Roy M. Griswold, Ballston Spa, NY (US); Slawomir Rubinsztaijn, Niskayuna, NY (US); Michael J. O'Brien, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/939,913

(22) Filed: Aug. 27, 2001

(65) Prior Publication Data

US 2003/0088042 A1 May 8, 2003

(51) Int. Cl.[7] .................. B32B 25/20; C08G 77/20; C08G 77/14
(52) U.S. Cl. .................. 428/447; 428/41.8; 428/451; 428/452; 525/474; 525/477; 525/478; 525/479; 528/15; 528/28; 528/31; 528/32; 528/40
(58) Field of Search .................. 428/41.8, 447, 428/451, 452; 525/474, 477, 478, 479; 528/15, 18, 31, 32, 40

(56) References Cited

U.S. PATENT DOCUMENTS

| 3,344,111 A | 9/1967 | Chalk |
| 3,418,731 A | 12/1968 | Anciaux |
| 3,419,593 A | 12/1968 | Willing |
| 3,445,420 A | 5/1969 | Kookootsedes et al. |
| 3,461,185 A | 8/1969 | Brown |
| 3,882,083 A | 5/1975 | Berger et al. |
| 3,989,667 A | 11/1976 | Lee et al. |
| 4,043,977 A | 8/1977 | deMontigny et al. |
| 4,057,596 A | 11/1977 | Takamizawa et al. |
| 4,061,609 A | 12/1977 | Bobear |
| 4,256,870 A | 3/1981 | Eckberg |
| 4,336,309 A * | 6/1982 | Jackel et al. ............ 427/387 |
| 4,337,332 A | 6/1982 | Melancon et al. |
| 4,347,346 A | 8/1982 | Eckberg |
| 4,386,135 A | 5/1983 | Campbell et al. |
| 4,465,818 A | 8/1984 | Shirahata et al. |
| 4,472,563 A | 9/1984 | Chandra et al. |
| 4,476,166 A | 10/1984 | Eckberg |
| 4,533,575 A | 8/1985 | Melancon |
| 4,556,605 A * | 12/1985 | Mogami et al. ............ 252/586 |
| 4,562,096 A | 12/1985 | Lo et al. |
| 4,742,103 A * | 5/1988 | Morita et al. ............ 524/174 |
| 4,772,515 A | 9/1988 | Hara et al. |
| 4,783,552 A | 11/1988 | Lo et al. |
| 5,036,117 A | 7/1991 | Chung et al. |
| 5,246,995 A * | 9/1993 | Murakami et al. ............ 524/265 |
| 5,506,289 A | 4/1996 | McDermott et al. |
| 5,516,558 A | 5/1996 | O'Brien |
| 5,567,764 A | 10/1996 | Brasseur et al. |
| 5,616,672 A * | 4/1997 | O'Brien et al. ............ 525/478 |
| 5,766,698 A * | 6/1998 | Singh et al. ............ 427/353 |
| 5,932,060 A * | 8/1999 | O'Brien et al. ............ 156/329 |
| 6,020,412 A * | 2/2000 | Muschelewicz et al. ..... 524/296 |
| 6,077,611 A * | 6/2000 | Griswold et al. ............ 428/352 |

FOREIGN PATENT DOCUMENTS

| EP | 0 057 984 A2 | 1/1982 |
| EP | 0 226 934 B1 | 9/1986 |
| EP | 0 226 934 A2 | 9/1986 |

* cited by examiner

Primary Examiner—Jeffrey B. Robertson
(74) Attorney, Agent, or Firm—Kenneth S. Wheelock

(57) ABSTRACT

The present invention relates to curable alkenyl based silicone release coating compositions having improved adhesion to paper and polymeric substrates. Furthermore the present invention relates to the process for making a silicone release coating with improved adhesion to paper and polymeric substrates.

22 Claims, No Drawings

PAPER RELEASE COMPOSITIONS HAVING IMPROVED ADHESION TO PAPER AND POLYMERIC FILMS

FIELD OF THE INVENTION

The present invention relates to curable alkenyl based silicone release coating compositions having improved adhesion to paper and polymeric substrates. The present invention also relates to additives that improve adhesion of silicone release coating compositions to paper and polymeric substrates. Furthermore the present invention relates to the process for making a silicone release coating with improved adhesion to paper and polymeric substrates.

BACKGROUND OF THE INVENTION

Curable silicone compositions are applied to substrates to aid in the release of adhesive materials thereon. Laminates comprising a release coated paper or polymeric film with a pressure sensitive adhesive and a sheet material that can be a decorative lamina or label are used by stripping off the release liner which is discarded and affixing the lamina or label onto a surface.

Typically these release compositions cure by one of two mechanisms, thermal curing or photo-catalytic curing. Thermally curing release systems generally are comprised of the following compositions:

(A) a linear alkenyl substituted polysiloxane polymer that is the primary component or base polymer of the curable composition;

(B) a hydride functional cross-linking silicone, typically a methyl hydrogen siloxane polymer, copolymer or oligomer;

(C) an addition cure hydrosilylation catalysts, typically either a platinum or rhodium based catalyst;

(D) a cure-inhibiting compound or mixtures thereof to increase the useful life of the coating bath.

The alkenyl functional silicone polymer release compositions typically used fall into one of two categories:

1) a linear alkenyl chain-stopped polymer:

$$M^{vi}D_xM^{vi} \quad 4)$$

where $M^{vi}$ indicates an alkenyl chain-stopping M group or 2) multi-functional alkenyl copolymers:

$$M^{vi}D_xD^{vi}_yM^{vi} \quad 5)$$

where $D^{vi}$ indicates an alkenyl substituted D group. The alkenyl chain stopped polymers, $M^{vi}D_xM^{vi}$, generally cure faster than the multi-functional copolymers, $M^{vi}D_xD^{vi}_yM^{vi}$. As release composites are delaminated, the formulations based on the linear alkenyl chain-stopped polymers show significant increases in the delaminating force necessary as delaminating speed increases. In contrast, while the multi-functional alkenyl polymers tend to have a slower curing speed the increase in delaminating force with increasing delaminating speed is not nearly as great proportionately.

While the general practice usually employs linear base polymers, (A), solventless, high solids content formulations have been described. As described in U.S. Pat. No. 4,448,815 ('815) a linear alkenyl siloxane base copolymer is a copolymer of:

(1) $R_cR_d^1Si_{(4-c-d)/2}$      1)

where R is generally an alkyl radical, $R^1$ is a low molecular weight olefinic substituent such as vinyl or allyl, c has value from 0 to 2 and the average of value of the sum c+d is 0.8 to 3; and (2) $R_nSiO_{(4-n)/2}$      2)

where R is generally an alkyl radical and n has a value of 0.8 to 2.5. The preferred base copolymer of the '815 patent has the following linear structure:

$$(H_2C=CH)R_2Si-O-(R_2Si-O-)_i-(RR^1Si-O-)_j-SiR_2(H_2C=CH)$$

where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chain stopped polymer;

(B') a linear methyl hydrogen polymer;

(C') a methyl vinyl polysiloxane having at least three vinyl groups per molecule;

(D') a methyl hydrogen polysiloxane having at least three hydride hydrogen atoms per molecule; and (E') a platinum hydrosilylation catalyst. Component (C') is described in the '596 patent as containing $(H_2C=CH)(CH_3)SiO_{2/2}(D^{vi})$, $(H_2C=CH)(CH_3)_2SiO_{1/2}(M^{vi})$, and $(H_2C=CH)SiO_{3/2}(T^{vi})$, units either singly or in combination with $(CH_3)_2SiO_{2/2}(D)$, $(CH_3)_3SiO_{1/2}(M)$, and $(CH_3)SiO_{3/2}(T)$. The optional inclusion of vinyl substituted T units and methyl T units permits the composition of the '596 patent to possess branched structures.

U.S. Pat. No. 4,386,135 describes a terminally unsaturated silicone polymer having the formula $$R_{4-a}Si((R_2SiO-)_bOSiR_2R^2)_a \quad 3)$$

where a may be 2, 3, or 4. When a 4 the formula produces a Q resin. When a=3, a T structure results and the structure possesses only a single branch point. When a=2, the formula devolves to an alkenyl chain stopped linear polymer.

Japanese patent publication Sho 46-2187 (2187/1971) teaches blending an epoxy functional silane and vinyltriacetoxysilane to improve anchorage of release coatings as described above onto paper and polymeric films. However, the acyloxy group liberated has the disadvantages of inhibiting addition cure, therefore slowing the addition curing process; liberating corrosive and objectionable odor hydrolysis products during the coating process. Furthermore, the acyloxy groups remaining in the release coating hydrolyzed over resulting in an undesirable interaction with the adhesive thus leading to undesirable delaminating release properties.

European patent 0226934A2 teaches adhesion promoting additives comprised of resins having alkenyl and alkoxy functional groups, blended with an epoxy functional silane. To those skilled in the art, it can be readily recognized that these have the disadvantage of increasing the release force during the delaminating process due to the resinous nature of the additive preventing low release force coatings from being available.

Japanese patent 07097520A2 teaches adhesion promoters comprised of alkenyl and meth(acryl)oxy functional cycloorganopolysiloxanes as additives for a release coating on polymeric films.

U.S. Pat. No. 5,567,764 teaches alkoxy containing alkenyl functional organopolysiloxanes as adhesion promoters for release coating onto polymeric films.

European patent 057984A2 teaches meth(acryl)oxy functional alkoxysilanes as adhesion promoters for release coatings on polymeric films.

Despite the above cited patents there still remains a need in the industry for release coating compositions, adhesion promoting additives which address the disadvantages of either stable adhesion to both paper and polymeric films, exhibit non-inhibiting effect on the curing, not liberate corrosive hydrolysis products, not exhibit objectionable odor during manufacturing of the laminate construction, not have hydrolysis products that would adversely interact with the adhesive used in the laminating construction, and a cost effective reproducible method of manufacture.

It is the object of this invention to provide a release coating, additive for a release coating that provides adhesion to paper and polymeric films, does not inhibit the addition cure process, does not liberate corrosive hydrolysis products, does not exhibit an objectionable odor during the manufacturing of the laminate construction, not liberate hydrolysis products that adversely interact with the adhesive used in the laminating construction. Furthermore, it is an objective of this invention to provide a process for making an additive exhibiting stable adhesion on paper and polymeric films when added to a release coating.

SUMMARY OF THE INVENTION

The release compositions of the present invention comprise additives for improved anchorage of release coatings comprising the reaction product of:

1) $R^E{}_h Si(OR^A)_h$;
2) $R^{vi}{}_i Si(OR^B)_i$;
3) A catalyst; and
4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3. The preferred catalysts are either an organo tin or organic acid such as formic acid.

The compositions of the present invention further comprise a curable alkenyl silicone having the formula:

$$M^{vi}{}_a T_b D_c M_d$$

where $M^{vi} = R_{3-p} R^1{}_p SiO_{1/2}$, where R is selected from the group consisting of one to forty carbon monovalent hydrocarbon radicals and $R^1$ is selected from the group consisting of two to forty carbon atom terminal olefinic monovalent hydrocarbon radicals, where p varies from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from about 2 to about 5, c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5; which composition is preferably crosslinked by a substantially linear hydrogen siloxane selected from the group of compounds:

$MD_e D'_f M$, $MD'_f M$, $MD_e D'_f M'$, $M'D_e D'_f M'$, and $M'D_e M'$ where $M = R'_3 SiO_{1/2}$, $M' = H_g R'_{3-g} SiO_{1/2}$, and $D = R'R'SiO_{2/2}$, and $D' = R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater. The substantially linear hydrogen siloxane is preferably selected from the group consisting of $MD_e D'_f M$, $MD'_f M$, and mixtures thereof.

Preferably the substituents, R, of the curable alkenyl silicone are methyl, trifluoropropyl or phenyl and $R^1$ is preferably selected from the group consisting of two to ten carbon atom alkenyl groups.

Further, in the substantially linear hydrogen siloxane R' is preferably methyl, trifluoropropyl or phenyl.

The compositions of the present invention may be utilized as a solventless composition, a composition diluted by a suitable solvent, or as an aqueous emulsion and find particular use in release compositions for paper and polymeric films.

DETAILED DESCRIPTION OF THE INVENTION

Release coatings are part of a laminate wherein a release coating is coated upon a substrate. Generally substrates suitable for release coatings are selected from the group consisting of paper, polymeric films such as those consisting of polyethylene, polypropylene, polyester.

The release compositions of the present invention comprise additives for improved anchorage of release coatings comprising the reaction product of:

5) $R^E{}_h Si(OR^A)_h$;
6) $R^{vi}{}_i Si(OR^B)_i$;
7) A catalyst; and
8) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3. The preferred catalysts are either an organo tin or organic acid such as formic acid.

The present invention further provides for an alkenyl curable silicone composition of the formula $$M^{vi}{}_a T_b D_c M_d$$

where $M^{vi} = R_{3-p} R^1{}_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3; $T = R^2 SiO_{3/2}$ where $R^2$ is selected from the group consisting of R and $R^1$, $D = R^3 R^4 SiO_{2/2}$ where $R^3$ and $R^4$ are each independently selected from the group consisting of R and $R^1$, and $M = R_3 SiO_{1/2}$ where each R is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The release compositions of the present invention comprise:

(A) additives for improved anchorage of release coatings comprising the reaction product of:
1) $R^E{}_h Si(OR^A)_h$;
2) $R^{vi} Si(OR^B)_i$;
3) A catalyst; and
4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3; the catalyst can be either an organo tin or formic acid and coating compositions comprising:

(B) an alkenyl silicone having the formula:

$$M^{vi}{}_a T_b D_c M_d$$

where the subscripts a, b, c, and d are as previously defined;

(C) a hydrogen siloxane selected from the group of compounds:

$MD_e D'_f M$ $MD'_f M$, $MD_e D'_f M'$ $M'D_e D'_f M'$, and $M'D_e M'$ where M is as previously defined and $M' = H_g R_{3-g} SiO_{1/2}$ $D = RRSiO_{2/2}$ where each R is independently selected and $D' = RHSiO_{2/2}$ where R is as previously defined, the subscripts e and f may be zero or positive wherein the sum of e and f ranges from about 10 to about 100 subject to the limitation that the sum of f and g is two or greater.

(D) a hydrosilylation catalyst comprising a metal selected from the group consisting of nickel, palladium, platinum, rhodium, iridium, ruthenium and osmium; and (E) a cure inhibitor.

The amount of component (A) that is used in this invention range from about 0.1 to 5.0 parts, preferably from 0.5 to 4.0, and more preferably from about 0.5 to 3.0 parts.

The amounts of Components (B) and (C) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

Broadly stated, Component (D) of the composition of this invention is a catalyst component which facilitates the reaction of the silicon-bonded hydrogen atoms of Component (C) with the silicon-bonded olefinic hydrocarbon radicals of Component (B) and can be any platinum-containing catalyst component. For example, Component (D) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispensability in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (C) with the silicon-bonded olefinic hydrocarbon radicals of Component (B). The exact necessary amount of said catalyst component will depend upon the particular catalyst and is not easily predictable. However, for chloroplatinic acid said amount can be as low as one part by weight of platinum for every one million parts by weight of organosilicon Components (B) plus (C). Preferably said amount is at least 10 parts by weight, on the same basis.

For compositions of this invention which are to be used in the coating method of this invention, the amount of platinum-containing catalyst component to be used is preferably sufficient to provide from 10 to 500 parts by weight platinum per one million parts by weight of organopolysiloxane components (B) plus (C).

The hydrosilylation catalyst is selected from the group consisting of catalysts comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730.

Inhibitors, component (E), for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420; 4,347,346 and 5,506,289; ethylenically unsaturated isocyanates, U.S.

Pat. No. 3,882,083; olefinic siloxanes, U.S. Pat. No. 3,989,667; unsaturated hydrocarbon diesters, U.S. Pat. No. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitrites, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitrites, and diaziridines.

Preferred inhibitors for the compositions of this invention are the maleates and alkynyl alcohols.

The amount of Component (E) to be used in the compositions of this invention is not critical and can be any amount that will retard the above-described platinum-catalyzed hydrosilylation reaction at room temperature while not preventing said reaction at moderately elevated temperature, i.e. a temperature that is 25 to 50° C. above room temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (E) can be 0.1–10% by weight, preferably 0.15–2% by weight, and most preferably 0.2–1% by weight.

The compositions of the present invention may be used either as formulations that are free of solvent, i.e. 100% solids, diluted with an organic solvent that is miscible, or as an aqueous emulsion. When the formulation of the present invention is used as a solventless coating, it is preferred that the viscosity of the alkenyl silicone be in a range varying from about 100 to about 10,000 centipoise, preferably from about 125 to about 1,000, more preferably from about 150 to about 500, and most preferably from about 200 to about 300 centipoise. This is most easily accomplished by manipulation of the ratios of the stoichiometric subscripts between the terminal M and $M^{vi}$ groups and the T-groups in the formula:

$$M^{vi}_a T_b D_c M_d$$

with one general consideration being that a+d>b. If this condition is not met, the alkenyl silicone can become much more viscous. This does not preclude use of the silicone as a release coating material because the silicone may be dispersed or dissolved in a suitable solvent and coated thereby.

It is generally appreciated that other components may be added to the compositions of the present invention such as bath life extenders as taught in U.S. Pat. Nos. 5,036,117 and 5,516,558; release additives for increasing the release force; fillers, extenders, reactive diluents, anchorage additives that improve adhesion to specific substrates, and the like.

When used as emulsions, the silicones of the present invention are generally emulsified by the addition of non-ionic surfactants, addition of water followed by processing in a colloid mill.

All United States patents referenced herein are herewith and hereby specifically incorporated by reference.

Experimental

The following examples are designed to illustrate the present invention and are not to be construed as limiting the invention as embodied in these specific examples.

EXAMPLE 1

Preparation of Anchorage Additive:

Additive A

To a reaction flask equipped with mixing capability, condenser, nitrogen atmosphere and heating was added 59.2 g of a vinyltrimethoxysilane (VTMS), 141.8 g (3-glycidoxypropyl)trimethoxysilane (GLYMO), 13.5 g deionized water added slowly with agitation then heating with a nitrogen purge to 145° C. removing volatiles in a deanstark trap. Collected 36.0 g volatiles. This composition viscosity at 25° C. was 7.8 csts.

Additive B

Procedure above repeated except the silanes and water were agitated at <100° C. for five hours then the temperature was increased to and held at 145° C. for 1 hour then cooled to room temperature. This composition viscosity at 25° C. was 15.6 csts.

COMPARISON EXAMPLE 1

An anchorage additive was prepared per Japanese patent 0462187 comprised of an epoxy functional silane and vinyltriacetoxysilane.

Release Coating with Anchorage Additives:

A release coating formulation was prepared by mixing:

| | |
|---|---|
| [1]SL6000-D1 | 666.0 g |
| [1]SL6010-D1 | 334.0 g |
| [1]SL6040-D1 | 2.0 g |
| [1]SL6020-D1 | 40.0 g |

This coating formulation with 1 and 3 weight % anchorage additives above were coated onto 142 gauge polyester film (PET) corona treated to 54 dyne cm using a five roll pilot coater[2] curing at 400 ft/min. (2.25 seconds dwell time), 265° F. (129° C.) exit web temperature with an average coat weight of 0.77 lb./ream. Samples were then adhesive coated using an acrylic emulsion adhesive using a #26 wet film applicator rod then dried for 2 minutes in a 250° F. convection oven followed by application of a 42# SCK paper facestock. These and non-adhesive coated film samples were evaluated after 10 days room temperature aging for anchorage by a finger rub-off method resulting in either a pass or fail result. The release coatings containing Additive A and Additive B at 1 weight % additive failed for both the non-adhesive and adhesive coated PET. At 3 wt. % Additive A and Additive B the non-adhesive coated films samples failed but the adhesive coated films passed rub-off. The Comparison Example 1 additive failed rub-off at both additive levels on non-adhesive and adhesive coated PET.

[1] GE Silicones, solventless thermal release coating
[2] Black Clawson Converting Machinery LLC, Fulton, N.Y.

EXAMPLE 2

Additive C

To a reaction flask equipped with mixing capability, condenser, nitrogen atmosphere and heating was added 100.0 g of a vinyltrimethoxysilane (VTMS), 478.3 g (3-glycidoxypropyl)trimethoxysilane (GLYMO), 36.4 g deionized water added slowly with agitation then heated at 80–100° C. removing volatiles in a deanstark trap followed by increasing the temperature to 145° C. The temperature was decreased to 100° C. and then devolatized under vacuum for 1 hour. This composition viscosity at 25° C. was 7.1 csts.

The additive was divided into two portions with 85 ppm titanate as tetraisopropyl titanate being added to one portion (Additive C1) and 85 ppm tin as dibutyl tin dilaurate to the second portion (Additive C2).

Additive D

To a reaction flask equipped with mixing capability, condenser, nitrogen atmosphere and heating was added 225.0 g of a vinyltrimethoxysilane (VTMS), 378.7 g (3-glycidoxypropyl)trimethoxysilane (GLYMO), 41.0 g deionized water added slowly with agitation while heating at 80–100° C. removing volatiles in a deanstark trap until volatiles ceased to be collected followed by increasing the temperature to 145° C. The temperature was decreased to 100° C. and devolatized under vacuum for 1 hour. This composition viscosity at 25° C. was 4.8 csts.

The additive was divided into two portions with 85 ppm titanate as tetraisopropyl titanate being added to one portion (Additive D1) and 85 ppm tin as dibutyl tin dilaurate to the second portion (Additive D2).

Additive E

To a reaction flask equipped with mixing capability, condenser, nitrogen atmosphere and heating was added 350.0 g of a vinyltrimethoxysilane (VTMS), 186.0 g (3-glycidoxypropyl)trimethoxysilane (GLYMO), 42.5 g deionized water added slowly with agitation then heated at 80–100° C. removing volatiles in a deanstark trap followed by increasing the temperature to 145° C. The temperature was decreased to 100° C. and devolatized under vacuum for 1 hour. This composition viscosity at 25° C. is 8.9 csts.

The additive was divided into two portions with 85 ppm titanate as tetraisopropyl titanate being added to one portion (Additive E1) and 85 ppm tin as dibutyl tin dilaurate to the second portion (Additive E2).

These anchorage additives were added at 3 wt. % to the release coating formulation of Example 1 then coated onto 142 gauge polyester film (PET) corona treated to 54 dyne cm using a five roll pilot coater[2] then curing at 400 ft/min. (2.25 seconds dwell time), 265° F. (129° C.) exit web temperature with a coat weight range of 0.65–0.79 lb./ream. Samples were then adhesive coated using an acrylic emulsion adhesive using a #26 wet film applicator rod then dried for 2 minutes at 250° F. in a convection oven followed by application of a 42# SCK paper facestock. These and non-adhesive coated film samples were evaluated after 6 days room temperature aging for anchorage by a finger rub-off method resulting in either a pass or fail result. Table 1 below shows that addition of an organo tin compound to an additive of this invention with a molar ratio range of 1.1 to 3.0 for (3-glycidoxypropyl)trimethoxysilane (GLYMO) to vinyltrimethoxysilane (VTMS) enhanced the anchorage and cure as demonstrated by the extractable silicone results.

TABLE 1

| | Co-catalyst: | | | |
|---|---|---|---|---|
| | Tetraisopropyl titanate Rub-Off Pass/Fail | Tetraisopropyl titanate % Silicone Extractables | Dibutyl tin dilaurate Rub-Off Pass/Fail | Dibutyl tin dilaurate % Silicone Extractables |
| Additive D - no organo Ti or Sn compound | — | — | Pass | 11.1 |
| Japanese patent 0462187 | Pass | 3.5 | Fail | 16.2 |
| Additive C | Fail | 9.7 | Pass | 2.4 |
| Additive D | Fail | 1.2 | Pass | 1.6 |
| Additive E | Smeared-poor cure | 22.3 | Smeared-poor cure | 11.3 |

EXAMPLE 3

A release coating was made with anchorage Additive D above varying the level of co-catalyst, additive amount, and exit web temperature:

A release coating formulation prepared by mixing:

| | |
|---|---|
| [1]SL6325 | 450.0 g |
| [1]SL6110-D1 | 450.0 g |
| [1]SS4300C | 3.3 g |
| Additive D | 18 to 45 g |

The above release coating formulation with anchorage additive D from Example 2 was coated onto 142 gauge polyester film (PET) corona treated to 54 dyne cm using a five roll pilot coater[2] with a coat weight range of 0.60–0.68 lb./ream. Samples were then adhesive coated using an acrylic emulsion adhesive using a #26 wet film applicator rod then dried for 2 minutes in a 250° F. convection oven followed by application of a 42# SCK paper facestock. Samples were aged at room temperature. Samples of non-adhesive coated PET were placed into a sealed container containing approximately 50 g deionized water into a 60° C. oven. Both the adhesive coated and non-adhesive coated film samples were evaluated after 10 days aging for anchorage by a finger rub-off method resulting in either a pass or fail result. Table 2 lists those passing rub-off (both adhesive coated and non-adhesive coated) with the ppm tin in the anchorage additive, wt. % additive in the release coating formulation, exit web temperature illustrative of the ranges for these factors. Silicone extractables ranged from 0.5–1.5% indicating very good cure. The comparison example 1 of Japanese patent 0462187 composition failed under these conditions.

TABLE 2

| ppm tin in Additive D | Wt. % Anchorage Additive D | Exit Web Temperature |
|---|---|---|
| 25 | 2 | 120° C. |
| 25 | 5 | 120° C. |
| 62.5 | 3.5 | 140° C. |
| 100 | 2 | 160° C. |

EXAMPLE 4

Additive F

To a reaction flask equipped with mixing capability, condenser, nitrogen atmosphere and heating was added 4720.0 g (3-glycidoxypropyl)trimethoxysilane, 2960.0 g vinyltrimethoxysilane, 500.0 g acetone, 386.0 g formic acid, 324.0 g deionized water added with agitation then heated 6 hours at 120° C. Volatiles were removed by heating at 120° C. under aspirator vacuum. This composition viscosity at 25° C. is 33.2 csts. and 7.23 wt % vinyl. The additive was divided into two portions with 0 ppm (Additive 1F) and 20 ppm tin as dibutyl tin dilaurate (Additive 2F).

A release coating formulation was prepared by mixing:

| | |
|---|---|
| [1]SL6625 | 600.0 g |
| [1]SL6110-D1 | 200.0 g |
| [1]SS4300C | 31.1 g |

The above coating formulation with 1.5 weight % anchorage Additives 1F and 2F above were coated onto 142 gauge polyester film (PET) corona treated to 58 dyne cm using a five roll pilot coater[2] curing at 300 ft/min. (3.00 seconds dwell time), 330° F. (166° C.) exit web temperature with a coat weight of 0.58–0.59 lb./ream. Samples were then adhesive coated using an acrylic emulsion adhesive using a #26 wet film applicator rod then dried for 2 minutes in a 250° F. convection oven followed by application of a 42# SCK paper facestock. These were evaluated after 7 days room temperature aging for anchorage by a finger rub-off method resulting in either a pass or fail result. Additive 1F failed while Additive 2F passed demonstrating the effect of incorporating tin as co-catalyst in the anchorage additive.

[1] GE Silicones, solventless thermal release coating
[2] Black Clawson Converting Machinery LLC, Fulton, N.Y.

EXAMPLE 5

Additives G-K were prepared by the method of Example 4 above then tested in the release coating of Example 4 where the molar ratio of silanes co-hydrolyzed, molar percent of water and formic acid were varied, and solvent/no solvent was used in the additive preparation process. Table 3 illustrates the wide ranges of acceptable variation in these factors, which yield a release coating exhibiting anchorage to PET film.

TABLE 3

| Additive | GLY MO | VTMS | Mole % Water | Mole % Formic Acid | Solvent | Viscosity, cstk. | Wt. % Vinyl | Rub-Off Pass/Fail |
|---|---|---|---|---|---|---|---|---|
| G | 354 g | 370 g | 43.2 | 57 | Yes | 59.7 | 13.04 | Pass |
| H | 354 g | 370 g | 21.6 | 57 | No | 15.5 | 10.47 | Pass |
| I | 354 g | 370 g | 43.2 | 20.2 | No | 15.7 | 11.35 | Pass |
| J | 472 g | 296 g | 32.4 | 38.6 | Yes | 24.8 | 7.55 | Pass |
| K | 590 g | 222 g | 21.6 | 20.2 | No | 7.2 | 3.35 | Pass |

Comparison additives prepared by the separate hydrolysis the two silanes in Additive F above then testing as in Example 4 demonstrates the advantage of the co-hydrolysis process for preparation of an anchorage additive. Below describes the preparation process and Table 4 the comparison results.

Comparison Additive 2

To a reaction flask equipped with mixing capability, condenser, nitrogen atmosphere and heating was added 4000.0 g (3-glycidoxypropyl)trimethoxysilane, 200.0 g formic acid, 137.0 g deionized water added slowly with agitation then heated five hours at <105° C. Volatiles were removed by heating to 150° C. and collecting volatiles in a deanstark. This composition viscosity at 25° C. was 34.8 csts. The additive was divided into two portions with 0 ppm (Comparison Additive 2A) and 20 ppm tin as dibutyl tin dilaurate (Comparison Additive 2B).

Comparison Additive 3

To a reaction flask equipped with mixing capability, condenser, nitrogen atmosphere and heating was added 4100.0 g vinyltrimethoxysilane, 204.0 g formic acid, 298.0 g deionized water added slowly with agitation then heated seven hours at 66–70° C. Volatiles were removed by heating to 150° C. and collecting volatiles in a deanstark. This composition viscosity at 25° C. was 4.9 csts. and 30.25 wt % vinyl. The additive was divided into two portions with 0 ppm (Comparison Additive 3A) and 20 ppm tin as dibutyl tin dilaurate (Comparison Additive 3B).

TABLE 4

| | ppm Tin | g SS4300C | Rub-Off Pass/Fail |
|---|---|---|---|
| grams of Comparison Additives 2B/3B | | | |
| 0 g/8 g | 20 | 35.0 | Fail |
| 1.6 g/6.4 g | 20 | 32.7 | Fail |
| 3.2 g/4.8 g | 20 | 30.4 | Fail |
| 4.8 g/3.2 g | 20 | 28.1 | Fail |
| 6.4 g/1.6 g | 20 | 25.8 | Fail |
| 8.0 g/0 g | 20 | 23.5 | Fail |
| grams of Comparison Additives 2A/3A | | | |
| 0 g/8 g | 0 | 35.0 | Fail |
| 4.8 g/3.2 g | 0 | 28.1 | Fail |
| 6.4 g/1.6 g | 0 | 25.8 | Fail |
| 8.0 g/0 g | 0 | 23.5 | Fail |

What is claimed is:
1. A release composition comprising
   (A) the reaction product of:
      1) $R^E{}_h Si(OR^A)_{4-h}$;
      2) $R^{vi}{}_i Si(OR^B)_{4-i}$;
      3) a condensation catalyst; and
      4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3 and (B) a curable alkenyl silicone having the formula $$M^{vi}{}_a T_b D_c M_d$$

where $M^{vi} = R_{3-p}R^1_p SiO_{1/2}$, where R is selected from the group consisting of one to forty carbon monovalent hydrocarbon radicals and $R^1$ is selected from the group consisting of two to forty carbon atom terminal olefinic monovalent hydrocarbon radicals, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5.

2. The composition of claim 1 additionally comprising a hydrogen siloxane selected from the group of compounds:

$MD_e D'_f M$,
$MD'_f M$,
$MD_e D'_f M'$,
$M'D_e D'_f M'$, and
$M'D_e M'$ where $M = R'_3 SiO_{1/2}$,
$M' = H_g R'_{3-g} SiO_{1/2}$, and
$D = R'R'SiO_{2/2}$, and
$D' = R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater.

3. The composition of claim 1 wherein the condensation catalyst is formic acid.

4. The composition of claim 2 wherein the condensation catalyst is an organo tin compound.

5. The composition of claim 3 where R is methyl, trifluoropropyl or phenyl and $R^1$ is selected from the group consisting of two to ten carbon atom alkenyl groups.

6. The composition of claim 4 where R' is methyl, trifluoropropyl or phenyl.

7. The composition of claim 5 wherein the subscripts a, b, and d satisfy the relationship a+d>b.

8. The composition of claim 6 wherein the viscosity ranges from about 100 to about 10,000 centipoise.

9. The composition of claim 6 wherein the viscosity ranges from about 125 to about 1,000 centipoise.

10. The composition of claim 8 further comprising water present as an emulsion.

11. A curable release composition comprising:
(A) the reaction product of:
1) $R^E_h Si(OR^A)_{4-h}$;
2) $R^{vi}_i Si(OR^B)_{4-i}$;
3) a tin condensation catalyst; and
4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3:

(B) an alkenyl silicone having the formula:

$M^{vi}_a T_b D_c M_d$ where $M^{vi} = R_{3-p} R^1_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5;

(C) a hydrogen sioxane selected from the group of compounds:

$MD_e D'_f M$,
$MD'_f M$,
$MD_e D'_f M'$,
$M'D_e D'_f M'$, and
$M'D_e M'$ where $M = R_3 SiO_{1/2}$,
$M' = H_g R_{3-g} SiO_{1/2}$, and
$D = RRSiO_{2/2}$, and
$D' = RHSiO_{2/2}$ wherein each R in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater;

(D) a hydrosilylation catalyst; and
(E) an inhibitor.

12. The composition of claim 10 wherein the hydrogen sioxane is selected from the group consisting of $MD_e D'_f M$,
$MD'_f M$,
and mixtures thereof.

13. The composition of claim 11 where R is methyl, trifluoropropyl or phenyl and $R^1$ is selected from the group consisting of two to ten carbon atom alkenyl groups.

14. The composition of claim 12 where R' is methyl, trifluoropropyl or phenyl.

15. The composition of claim 13 wherein the subscripts a, b, and d satisfy the relationship a+d>b.

16. The composition of claim 14 wherein the viscosity ranges from about 100 to about 10,000 centipoise.

17. The composition of claim 15 wherein the viscosity ranges from about 125 to about 1,000 centipoise.

18. An aqueous emulsion comprising the composition of claim 11.

19. A cured paper release composition comprising:
(A) the reaction product of:
1) $R^E_h Si(OR^A)_{4-h}$;
2) $R^{vi}_i Si(OR^B)_{4-i}$;
3) a tin condensation catalyst; and
4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3;

(B) an alkenyl silicone having the formula:

$$M^{vi}{}_a T_b D_c M_d$$

where $M^{vi} = R_{3-p} R^1{}_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5;

(C) a hydrogen siloxane selected from the group of compounds:
$MD_e D'_f M$,
$MD'_f M$,
$MD_e D'_f M'$,
$M' D_e D'_f M'$, and
$M' D_e M'$ where M is as previously defined and
$M' = H_g R_{3-g} SiO_{1/2}$
$D = RRSiO_{2/2}$ where each R is independently selected and
$D' = RHSiO_{2/2}$
where R is as previously defined, the subscripts e and f may be zero or positive wherein the sun i of e and f ranges from about 10 to about 100 subject to the limitation that the sum of f and g is two or greater;

(D) a hydrosilylation catalyst; and (E) an inhibitor.

20. A curable paper release composition consisting essentially of (A) The release compositions of the present invention comprise additives for improved anchorage of release coatings comprising the reaction product of:
1) $R^E{}_h Si(OR^A)_{4-h}$;
2) $R^{vi} Si(OR^B)_{4-i}$;
3) a tin condensation catalyst; and
4) water where $R^E$ is an oxirane or epoxide containing radical having from two to forty carbon atoms, $R^{vi}$ is selected from the group consisting of two to forty carbon atom terminal olefinic monovalent hydrocarbon radicals, $R^A$ is selected from the group consisting of one to forty carbon monovalent hydrocarbon radicals; $R^B$ is selected from the group consisting of one to forty carbon monovalent hydrocarbon radicals, where h varies from 1 to 3 and where i varies from 1 to 3;

(B) an alkenyl silicone having the formula:

$$M^{vi}{}_a T_b D_c M_d$$

where $M^{vi} = R_{3-p} R^1{}_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5;

(C) a substantially linear hydrogen siloxane selected from the group of compounds:
$MD_e D'_f M$,
$MD'_f M$,
$MD_e D'_f M'$,
$M' D_e D'_f M'$, and
$M' D_e M'$ where M is as previously defined and
$M' = H_g R_{3-g} SiO_{1/2}$
$D = RRSiO_{2/2}$ where each R is independently selected and
$D' = RHSiO_{2/2}$
where R is as previously defined, the subscripts e and f may be zero or positive wherein the sum of e and f ranges from about 10 to about 100 subject to the limitation that the sum of f and g is two or greater;

(D) a hydrosilylation catalyst; and (F) an inhibitor.

21. A laminate having a substrate and a coating said coating comprising the composition of claim 1.

22. The laminate of claim 21 wherein the substrate is selected from the group consisting of paper and polymeric films said polymeric films selected from the group consisting of polyethylene, polypropylene, and polyester.

* * * * *